United States Patent
Muramatsu

(10) Patent No.: US 12,315,279 B2
(45) Date of Patent: May 27, 2025

(54) IMAGE PROCESSING APPARATUS, NON-TRANSITORY STORAGE MEDIUM, AND IMAGE PROCESSING METHOD

(71) Applicant: CANON KABUSHIKI KAISHA, Tokyo (JP)

(72) Inventor: Yusuke Muramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 17/821,139

(22) Filed: Aug. 19, 2022

(65) Prior Publication Data

US 2023/0063374 A1 Mar. 2, 2023

(30) Foreign Application Priority Data

Aug. 26, 2021 (JP) .................................. 2021-137679

(51) Int. Cl.
*G06V 30/41* (2022.01)
*G06V 30/148* (2022.01)
*G06V 30/19* (2022.01)
*H04N 1/00* (2006.01)

(52) U.S. Cl.
CPC ............ *G06V 30/41* (2022.01); *G06V 30/153* (2022.01); *G06V 30/1916* (2022.01); *H04N 1/00331* (2013.01)

(58) Field of Classification Search
CPC .. G06V 30/41; G06V 30/153; G06V 30/1916; G06V 30/1444; H04N 1/00331
USPC ....................................................... 382/311
See application file for complete search history.

(56) References Cited

U.S. PATENT DOCUMENTS

| | | | | |
|---|---|---|---|---|
| 8,249,399 B2* | 8/2012 | Barkan | ................ | G06V 10/987 |
| | | | | 382/229 |
| 8,780,374 B2* | 7/2014 | Hamada | ............. | H04N 1/32133 |
| | | | | 358/1.14 |
| 10,057,443 B2* | 8/2018 | Hirao | ..................... | H04N 1/053 |
| 10,936,893 B2* | 3/2021 | Hayashi | ............. | H04N 1/40062 |
| 11,025,792 B2* | 6/2021 | Murakami | ......... | H04N 1/00801 |
| 11,252,287 B2* | 2/2022 | Soga | ................... | H04N 1/00514 |
| 11,297,192 B2* | 4/2022 | Mori | ..................... | G06V 10/945 |
| 11,301,675 B2* | 4/2022 | Kato | ................... | H04N 1/00127 |
| 2007/0206884 A1* | 9/2007 | Kato | ..................... | G06V 30/262 |
| | | | | 382/229 |
| 2010/0149587 A1* | 6/2010 | Yoshida | ............. | H04N 1/00222 |
| | | | | 358/1.15 |
| 2019/0197305 A1* | 6/2019 | Kanada | .................. | G06V 30/40 |
| 2019/0251313 A1* | 8/2019 | Liu | ..................... | G06K 7/10722 |
| 2020/0311980 A1* | 10/2020 | Shinohara | ............. | G06T 1/0007 |
| 2021/0081660 A1* | 3/2021 | Okada | ................... | G06V 30/416 |
| 2021/0142083 A1* | 5/2021 | Nakatani | ............ | G06V 30/1983 |

(Continued)

FOREIGN PATENT DOCUMENTS

JP 2020201822 A 12/2020

*Primary Examiner* — Negussie Worku
(74) *Attorney, Agent, or Firm* — Canon U.S.A., Inc. IP Division

(57) ABSTRACT

When a character string corresponding to a predetermined item is not extracted in a first document image as a processing target by entity extraction processing, the character string corresponding to the predetermined item in the first document image is acquired based on positional information about an area where the character string corresponding to the predetermined item is previously extracted in a second document image having the same format as that of the first document image.

10 Claims, 15 Drawing Sheets

(56) References Cited

U.S. PATENT DOCUMENTS

| | | | |
|---|---|---|---|
| 2021/0224531 A1* | 7/2021 | Nakamura | G06V 30/413 |
| 2021/0227082 A1* | 7/2021 | Mori | G06V 30/412 |
| 2022/0237933 A1* | 7/2022 | Mori | H04N 1/0044 |
| 2023/0063374 A1* | 3/2023 | Muramatsu | G06V 30/41 |

* cited by examiner

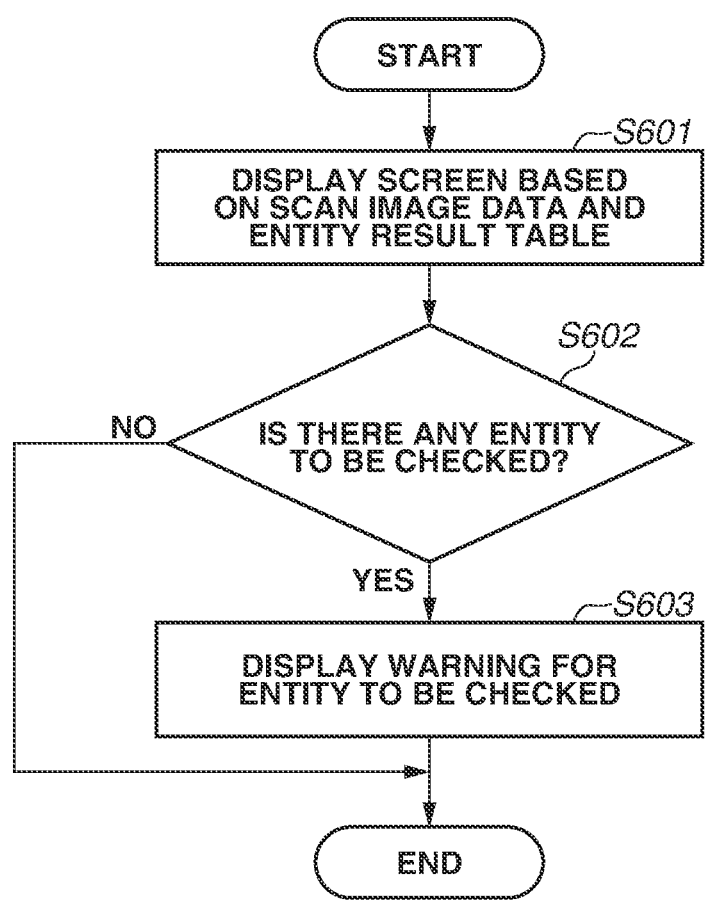

QUOTATION

WE ARE PLEASED TO QUOTE AS FOLLOWS.

BILL TO
TAMAGAWA CORPORATION
MR. JIRO HITOTSUBASHI

ISSUED BY
GLOBAL INDUSTRY CORPORATION
TOSHIRO MIKI

TOTAL ESTIMATED COST: ¥50,000

702

TITLE
BS | 874, 333, 511, 73
CHARACTER STRING | QUOTATION

NAME OF ORGANIZATION ISSUING DOCUMENT
BS | 196, 790, 465, 36
CHARACTER STRING | GLOBAL INDUSTRY CORPORATION

704 ⚠

NAME OF PERSON ISSUING DOCUMENT
BS | 197, 833, 309, 35
CHARACTER STRING | TOSHIRO MIKI

703 SAVE

FIG. 10

SCAN SETTING TABLE

| BUTTON NUMBER | NAME | ENTITY SETTING | COLOR | RESOLUTION | DOUBLE-SIDED/ SINGLE-SIDED | SHEET SIZE | FILE TYPE | DESTINATION |
|---|---|---|---|---|---|---|---|---|
| BTN1 | SCAN OF RECEIVED QUOTATION | TITLE, NAME OF ORGANIZATION ISSUING DOCUMENT, NAME OF PERSON ISSUING DOCUMENT | BW | 300 | DOUBLE-SIDED | AUTO | PDF | CLOUD STORAGE SERVER |
| BTN2 | SCAN OF CONTRACT TO BE SUBMITTED | NAME OF ORGANIZATION TO RECEIVE DOCUMENT, NAME OF PERSON TO RECEIVE DOCUMENT, DOCUMENT NUMBER, DOCUMENT CREATION DATE | COLOR | 300 | SINGLE-SIDED | A4 | JPEG | CLOUD STORAGE SERVER |

FIG.11

BS/OCR RESULT TABLE

| NUMBER | BS AREA | CHARACTER STRING |
|---|---|---|
| BS1 | 874, 333, 511, 73 | QUOTATION |
| BS2 | 39, 421, 1427, 35 | WE ARE PLEASED TO QUOTE AS FOLLOWS. |
| BS3 | 121, 608, 114, 34 | BILL TO |
| BS4 | 198, 652, 299, 35 | TAMAGAWA CORPORATION |
| BS5 | 197, 691, 234, 36 | MR. JIRO HITOTSUBASHI |
| BS6 | 120, 749, 112, 35 | ISSUED BY |
| BS7 | 196, 790, 465, 36 | GLOBAL INDUSTRY CORPORATION |
| BS8 | 197, 833, 309, 35 | TOSHIRO MIKI |
| BS9 | 246, 1106, 1231, 35 | TOTAL ESTIMATED COST: ¥50,000 |

FIG.12

LEARNED FORM TABLE

| BUTTON NUMBER | FORM NUMBER | NUMBER | BS AREA | CATEGORY |
|---|---|---|---|---|
| BTN1 | 1 | BS1 | 874, 333, 511, 73 | |
| BTN1 | 1 | BS2 | 39, 421, 1427, 35 | |
| BTN1 | 1 | BS3 | 121, 608, 114, 34 | |
| BTN1 | 1 | BS4 | 198, 652, 299, 35 | |
| BTN1 | 1 | BS5 | 197, 691, 234, 36 | |
| BTN1 | 1 | BS6 | 120, 749, 112, 35 | |
| BTN1 | 1 | BS7 | 196, 790, 465, 36 | |
| BTN1 | 1 | BS8 | 197, 833, 309, 35 | |
| BTN1 | 1 | BS9 | 246, 1106, 1231, 35 | |
| BTN1 | 1 | ET1 | 874, 333, 511, 73 | TITLE |
| BTN1 | 1 | ET2 | 196, 790, 465, 36 | NAME OF ORGANIZATION ISSUING DOCUMENT |
| BTN1 | 1 | ET3 | 197, 833, 309, 35 | NAME OF PERSON ISSUING DOCUMENT |
| BTN1 | 2 | BS1 | 1079, 436, 282, 45 | |
| BTN1 | 2 | BS2 | 584, 670, 276, 30 | |
| BTN1 | 2 | BS3 | 1255, 689, 283, 30 | |
| BTN1 | 2 | BS4 | 1287, 842, 113, 31 | |
| BTN1 | 2 | ET1 | 1079, 436, 282, 45 | TITLE |
| BTN1 | 2 | ET2 | 1255, 689, 283, 30 | NAME OF ORGANIZATION ISSUING DOCUMENT |
| BTN1 | 2 | ET3 | 1287, 842, 113, 31 | NAME OF PERSON ISSUING DOCUMENT |

FIG.13

ENTITY RESULT TABLE

| NUMBER | CATEGORY | BS AREA | CHARACTER STRING | CHECK REQUIRED |
|---|---|---|---|---|
| ET1 | TITLE | 874, 333, 511, 73 | QUOTATION | 0 |
| ET2 | NAME OF ORGANIZATION ISSUING DOCUMENT | 196, 790, 465, 36 | GLOBAL INDUSTRY CORPORATION | 0 |
| ET3 | NAME OF PERSON ISSUING DOCUMENT | 197, 833, 309, 35 | TOSHIRO MIKI | 1 |

FIG. 14

ENTITY RESULT TABLE

| NUMBER | CATEGORY | BS AREA | CHARACTER STRING | CHECK REQUIRED |
|---|---|---|---|---|
| ET1 | TITLE | 874, 333, 511, 73 | QUOTATION | 0 |
| ET2 | NAME OF ORGANIZATION ISSUING DOCUMENT | 196, 790, 465, 36 | GLOBAL INDUSTRY CORPORATION | 0 |
| ET3 | NAME OF PERSON ISSUING DOCUMENT | | | 0 |

FIG.15

LEARNED FORM

| BUTTON NUMBER | FORM NUMBER | NUMBER | BS AREA | CATEGORY |
|---|---|---|---|---|
| BTN1 | 1 | BS1 | 874, 333, 511, 73 | |
| BTN1 | 1 | BS2 | 39, 421, 1427, 35 | |
| BTN1 | 1 | BS3 | 121, 608, 114, 34 | |
| BTN1 | 1 | BS4 | 198, 652, 299, 35 | |
| BTN1 | 1 | BS5 | 197, 691, 234, 36 | |
| BTN1 | 1 | BS6 | 120, 749, 112, 35 | |
| BTN1 | 1 | BS7 | 196, 790, 465, 36 | |
| BTN1 | 1 | BS8 | 197, 833, 309, 35 | |
| BTN1 | 1 | BS9 | 246, 1106, 1231, 35 | |
| BTN1 | 1 | ET1 | 874, 333, 511, 73 | TITLE |
| BTN1 | 1 | ET2 | 196, 790, 465, 36 | NAME OF ORGANIZATION ISSUING DOCUMENT |
| BTN1 | 1 | ET3 | 197, 833, 309, 35 | NAME OF PERSON ISSUING DOCUMENT |

IMAGE PROCESSING APPARATUS, NON-TRANSITORY STORAGE MEDIUM, AND IMAGE PROCESSING METHOD

BACKGROUND

Field

The present disclosure relates to a technique for extracting a character string corresponding to a predetermined item from a document image.

Description of the Related Art

Japanese Patent Application Laid-Open No. 2020-201822 discusses a method of finding a character string corresponding to a desired item in a document image and extracting a character string that is a value corresponding to the item using a search rule based on the item.

SUMMARY

According to an aspect of the present disclosure, an image processing apparatus includes at least one memory that stores a program, and at least one processor that executes the program to obtain a character recognition result by performing character recognition processing on a first document image as a processing target, extract a character string corresponding to a predetermined item by performing entity extraction based on the character recognition result, and acquire, in a case where the character string corresponding to the predetermined item is not extracted in the first document image by the entity extraction, the character string corresponding to the predetermined item in the first document image, based on positional information about an area where the character string corresponding to the predetermined item is previously extracted in a second document image having a same format as a format of the first document image.

Further features of the present disclosure will become apparent from the following description of exemplary embodiments with reference to the attached drawings.

BRIEF DESCRIPTION OF THE DRAWINGS

FIG. 6 is a flowchart illustrating processing result display by an information processing terminal according to the first exemplary embodiment.

FIG. 7 is a diagram illustrating a display example of the processing result display according to the first exemplary embodiment.

FIG. 10 is a diagram illustrating an example of a scan setting table.

FIG. 11 is a diagram illustrating an example of a block selection (BS)/optical character recognition (OCR) result table.

FIG. 12 is a diagram illustrating an example of a learned form table.

FIG. 13 is a diagram illustrating an example of an entity result table.

FIG. 14 is a diagram illustrating another example of the entity result table.

FIG. 15 is a diagram illustrating an example of data on a learned form determined to have the same format.

DESCRIPTION OF THE EMBODIMENTS

Figure 1:
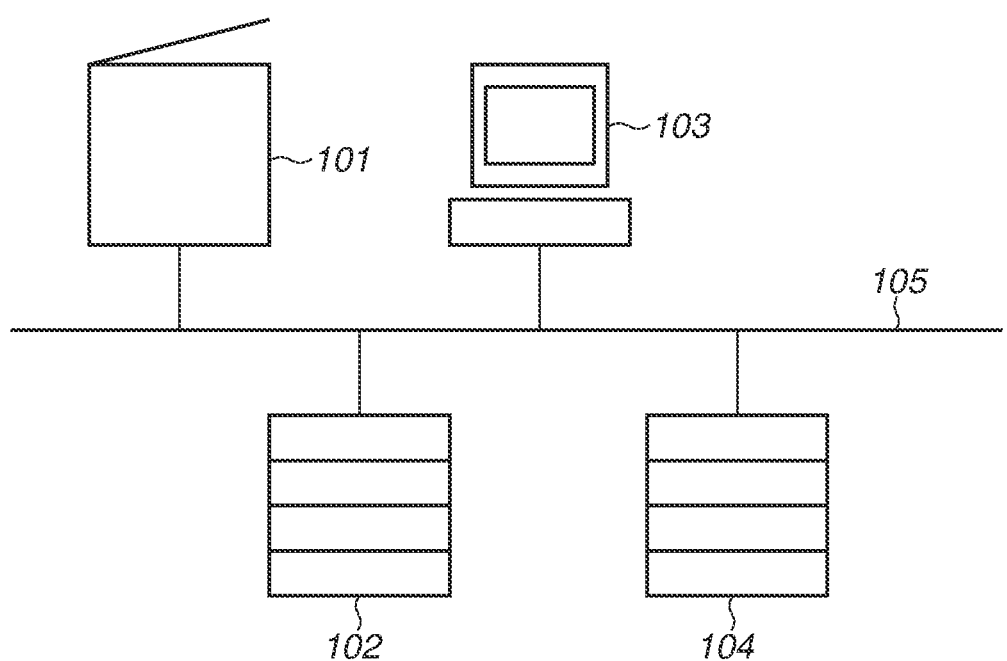
FIG. 1 is a diagram illustrating a configuration example of an image processing system according to a first exemplary embodiment.

FIG. 1 illustrates a configuration example of an image processing system according to a first exemplary embodiment of the present disclosure. The image processing system includes an image forming apparatus 101, an image processing server (an image processing apparatus) 102, an information processing terminal 103, and a storage server 104. The image forming apparatus 101, the image processing server 102, the information processing terminal 103, and the storage server 104 are communicably connected with each other via a network 105.

While in the present exemplary embodiment, an example where a multifunction peripheral (MFP) including a scan function, a print function, and a copy function is described as an example of the image forming apparatus 101, the image forming apparatus 101 is not limited to an MFP. For example, any apparatus including the scan function can execute processing according to the present exemplary embodiment to be described below. The scan function is to scan a document (e.g., a form) using a scanner 203 (refer to FIG. 2) included in the image forming apparatus 101 to generate image data, and transmit the generated image data to an external apparatus. The print function is to print print data received from the information processing terminal 103 or the like. The copy function is to print image data of the document scanned using the scanner 203 to obtain a copy of the document.

As described below, the image forming apparatus 101 according to the present exemplary embodiment is configured to issue an image transmission request for transmitting the image data of a scanned document to the storage server 104 via the image processing server 102.

The image processing server 102 is configured to perform image processing on the image data received from the image forming apparatus 101, transmit the image data subjected to the image processing to the storage server 104, and store the image data in the storage server 104. The image processing server 102 may also be configured to transmit a notification that image data is received from the image forming apparatus 101 to the information processing terminal 103 and to transmit the image data to the storage server 104 upon reception of an image data storage request from the information processing terminal 103.

Figure 2:
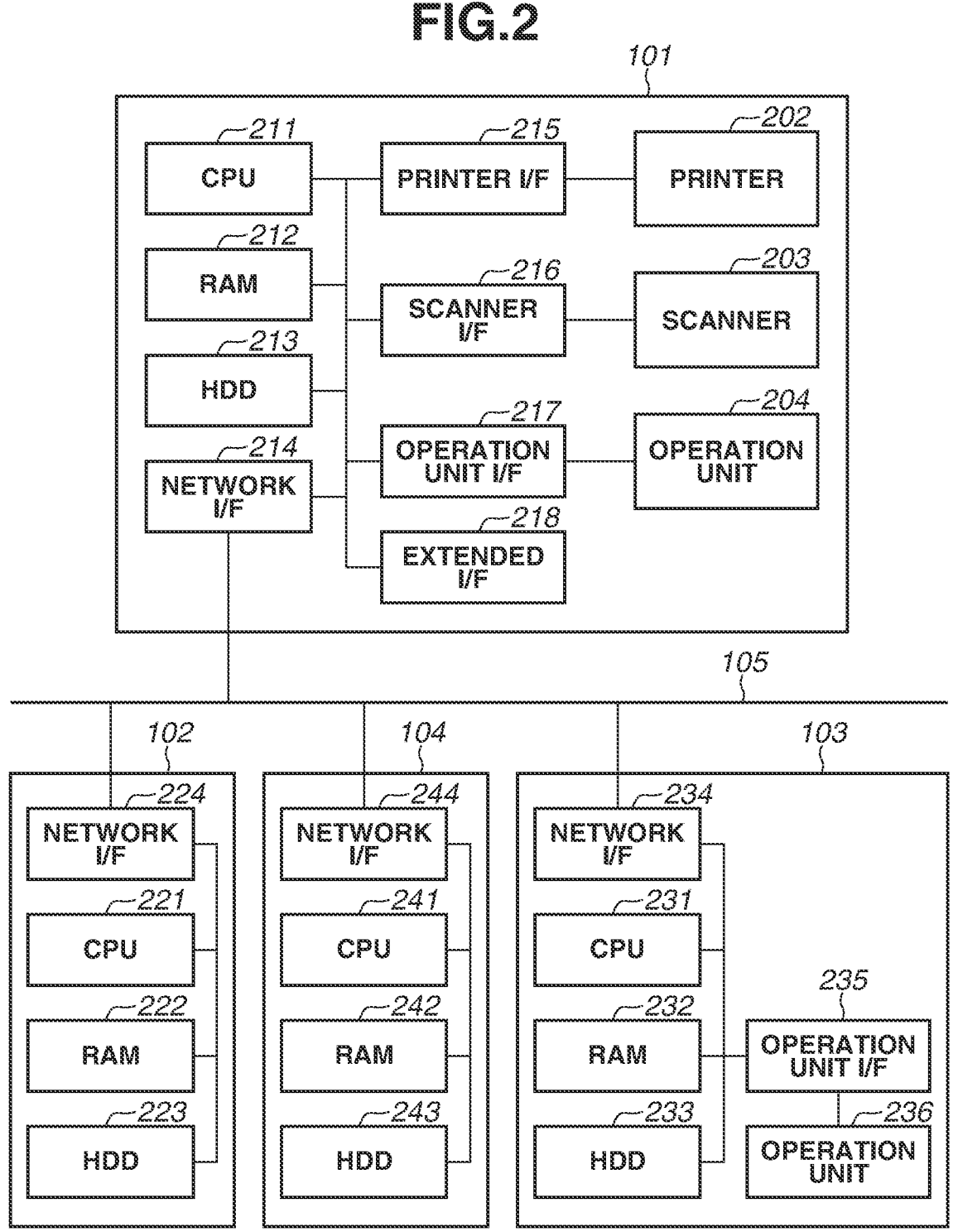
FIG. 2 is a block diagram illustrating a hardware configuration example of the image processing system according to the first exemplary embodiment.

FIG. 2 is a block diagram illustrating a hardware configuration example of the image processing system according to the present exemplary embodiment. The image forming apparatus 101 includes a printer 202, the scanner 203, an operation unit 204, a central processing unit (CPU) 211, a random access memory (RAM) 212, a hard disk drive (HDD) 213, a network interface (I/F) 214, a printer I/F 215, a scanner I/F 216, an operation unit I/F 217, and an extended I/F 218. The CPU 211 can exchange data with the RAM 212, the HDD 213, the network I/F 214, the printer I/F 215, the scanner I/F 216, the operation unit I/F 217, and the extended I/F 218. The CPU 211 loads a command (a computer program) read out from the HDD 213 into the RAM 212 and executes the command loaded into the RAM 212, thereby controlling the execution of each processing to be described below. In other words, a processor of the image forming apparatus 101 reads out a program from a computer-readable storage medium (e.g., the HDD 213) and executes the program, thereby functioning as a processing unit for executing each processing to be described below.

The HDD 213 can store commands (programs) that can be executed by the CPU 211, setting values used by the image forming apparatus 101, data on processing requested by a user, and the like. The RAM 212 is an area for temporarily storing the commands read out by the CPU 211 from the HDD 213. The RAM 212 can also store various data to be used for executing the commands. For example, image processing can be performed by loading input data into the RAM 212.

The network I/F 214 is an interface for performing network communication with the other apparatuses in the image processing system. The network I/F 214 can transmit a notification about data reception to the CPU 211 and also transmit data on the RAM 212 to the network 105 according to an instruction from the CPU 211.

The printer I/F 215 can transmit the print data to be printed to the printer 202 according to an instruction from the CPU 211, and transmit printer state information received from the printer 202 to the CPU 211.

The scanner I/F 216 can transmit an image scan instruction received from the CPU 211 to the scanner 203, and transmit image data received from the scanner 203 to the CPU 211. The scanner I/F 216 can also transmit scanner state information received from the scanner 203 to the CPU 211.

The operation unit I/F 217 can transmit an instruction issued by the user via the operation unit 204 to the CPU 211, and display screen information to be used by the user to perform an operation, on the operation unit 204. The extended I/F 218 enables connection of an external apparatus to the image forming apparatus 101. For example, the extended I/F 218 includes an interface in the form of a universal serial bus (USB). Connecting an external storage device, such as a USB memory, to the extended I/F 218 enables the image forming apparatus 101 to read data stored in the external storage device and to write data to the external storage device.

The printer 202 is configured to print the image data received via the printer I/F 215 on a sheet and to transmit information about the state of the printer 202 to the printer I/F 215. The scanner 203 is configured to transmit the image data obtained by scanning a document (e.g., a form) placed on the scanner 203 to the scanner I/F 216 according to an image scan instruction received via the scanner I/F 216. The scanner 203 is also configured to transmit information about the state of the scanner 203 to the scanner I/F 216. The operation unit 204 is an interface for issuing various instructions to the image forming apparatus 101 based on a user operation. For example, the operation unit 204 includes a touch panel liquid crystal screen. The operation unit 204 is configured to display an operation screen and to receive an operation from the user.

The image processing server 102 includes a CPU 221, a RAM 222, an HDD 223, and a network I/F 224. The CPU 221 can entirely control the image processing server 102 and can also control data exchange with the RAM 222, the HDD 223, and the network I/F 224. The CPU 221 loads a control program (a command) read out from the HDD 223 into the RAM 222 and executes the program. In other words, a processor of the image processing server 102 reads out a program from a computer-readable storage medium (e.g., the HDD 223) and executes the program, thereby functioning as a processing unit for executing each processing to be described below. The HDD 223 of the image processing server 102 can manage scan related information and information for identifying an entity to be extracted.

The information processing terminal 103 includes a CPU 231, a RAM 232, an HDD 233, a network I/F 234, an operation unit I/F 235, and an operation unit 236. The CPU 231 can entirely control the information processing terminal 103 and can also control data exchange with the RAM 232, the HDD 233, the network I/F 234, the operation unit I/F 235, and the operation unit 236. The CPU 231 loads a control program (a command) read out from the HDD 233 into the RAM 232 and executes the program. The operation unit I/F 235 is an interface for transmitting an instruction input by the user via the operation unit 236 to the CPU 231 and transmitting information about an operation screen to be displayed to the operation unit 236, based on display control by the CPU 231. An image data check application 330 (refer to FIG. 3) is installed on the information processing terminal 103. When the image data check application 330 is executed, a function of displaying the image data received from the image processing server 102 and issuing an image data storage request can be used. If the image data check application 330 is provided as a web application, the information processing terminal 103 may be configured to display the image data or issue the image data storage request by executing the web application via a web browser. In other words, a processor of the information processing terminal 103 reads out a program from a computer-readable storage medium (e.g., the HDD 233) to execute the program, or executes the program received via the network 105, thereby making it possible to check image data.

The storage server 104 includes a CPU 241, a RAM 242, an HDD 243, and a network I/F 244. The CPU 241 can entirely control the storage server 104 and can also control data exchange with the RAM 242, the HDD 243, and the network I/F 244.

The CPU 241 loads a control program (a command) read out from the HDD 243 into the RAM 242 and executes the program. The HDD 243 of the storage server 104 can hold the image data received from the image processing server 102.

Figure 3:
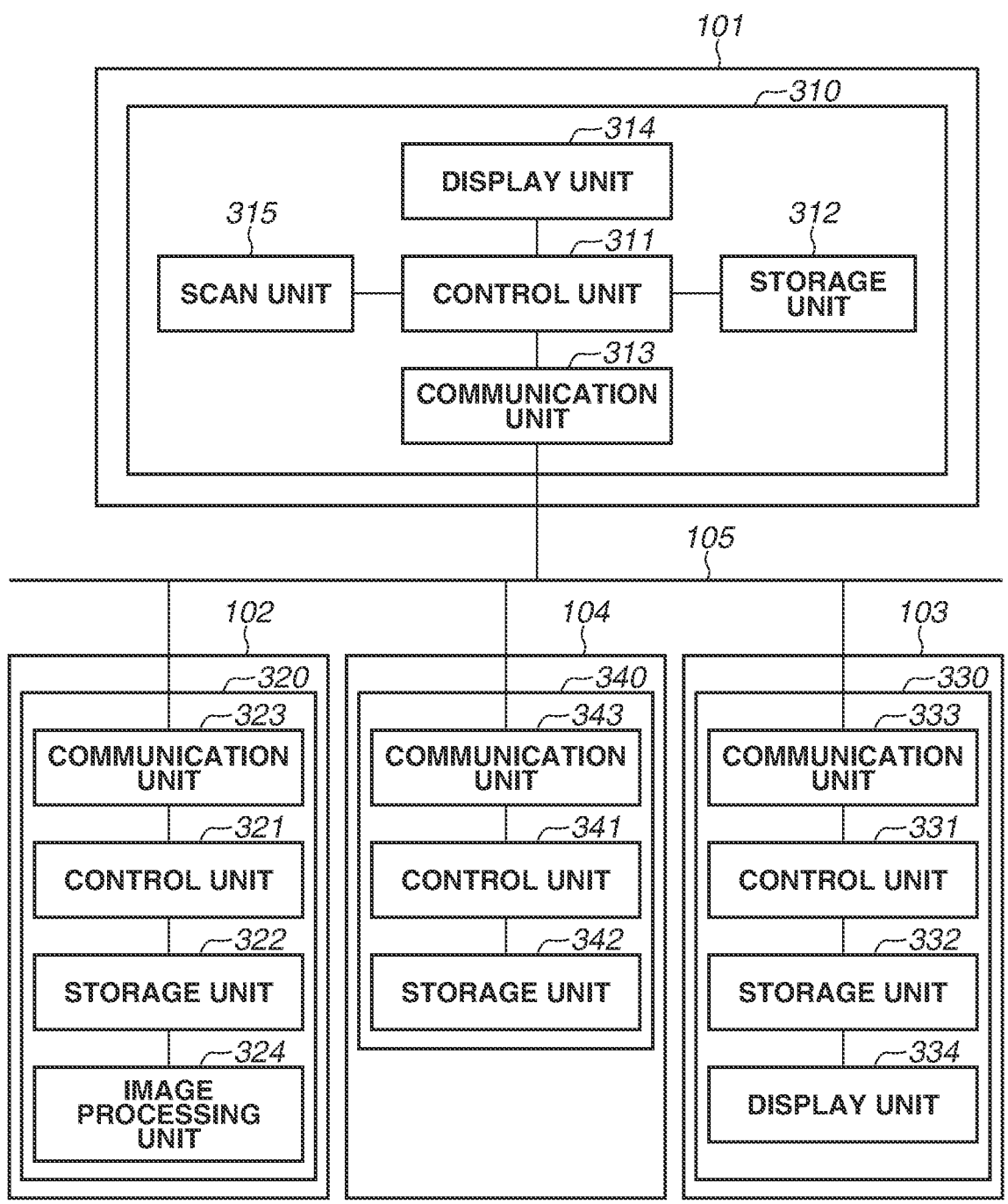
FIG. 3 is a block diagram illustrating a software configuration example of the image processing system according to the first exemplary embodiment.

FIG. 3 is a block diagram illustrating a software configuration example of the image processing system according to the present exemplary embodiment. The CPU of each of the apparatuses executes a software program and cooperates with hardware modules, such as a scanner and an HDD, thereby functioning as a processing unit for performing the following processing.

A controller 310 of the image forming apparatus 101 includes a control unit 311, a storage unit 312, a communication unit 313, a display unit 314, and a scan unit 315. The control unit 311 has an overall processing function related to the functions of the controller 310. The storage unit 312 has a function of holding scan settings and a function of holding image data received by scanning. The communication unit 313 has a function of transmitting the scan image data and the scan setting information to the image processing server 102 via the network 105. The display unit 314 has a function of receiving a scan request from the user via the operation unit 204 and notifying the control unit 311 of the request. The scan unit 315 receives a scan request from the control unit 311 and issues a scan processing execution instruction to the scanner 203 via the scanner I/F 216. The image data received by the execution of scan processing is transmitted to the control unit 311.

An image processing service 320 provided by the image processing server 102 is implemented by a control unit 321, a storage unit 322, a communication unit 323, and an image processing unit 324. The control unit 321 has an overall processing function related to the functions of the image processing service 320. The storage unit 322 has a function of holding the scan settings, a function of holding the image data received from the image forming apparatus 101, and a function of holding a learned form to be used for image data matching.

The function of holding the scan settings that the storage unit 322 has will now be described. Different scan settings are enabled with different buttons to be pressed by the user. For example, the scan settings are held in a scan setting table as illustrated in FIG. 10.

The scan setting table illustrated in FIG. 10 includes nine columns, i.e., the "button number" column, the "name" column, the "entity setting" column, the "color" column, the "resolution" column, the "double-sided/single-sided" column, the "sheet size" column, the "file type" column, and the "destination" column.

The "button number" column indicates a unique number for identifying a button. The "name" column indicates a button name to be displayed with the button on the display unit 314 of the image forming apparatus 101. The "entity setting" column indicates categories of entities to be extracted by the image processing unit 324 of the image processing server 102 from an optical character recognition (OCR) result of a scan image. An entity acquisition method will be described below.

Each of the "color", "resolution", "double-sided/single-sided", and "sheet size" columns indicates an operation setting during scanning. More specifically, the "color" column indicates whether an image to be generated by scanning is a color image or a black-and-white image, the "resolution" column indicates an image resolution, the "double-sided/single-sided" column indicates double-sided scanning or single-sided scanning, and the "sheet size" column indicates the size of a sheet to be scanned.

The "file type" column indicates a format of a file to be used to output a scan image, and the "destination" column indicates a transmission destination of the file.

After a user login (not illustrated), the image forming apparatus 101 acquires the scan setting table and displays the buttons on the display unit 314. When the user selects one of the displayed buttons, the image forming apparatus 101 detects the selected button and executes scanning of a document, such as a form, to generate a scan image (a document image) based on the setting corresponding to the selected button. The image forming apparatus 101 transmits the scan image (the document image) generated by scanning and the button number of the button selected by the user.

The communication unit 323 has a function of receiving document image data from the image forming apparatus 101, a function of transmitting a processing result to the information processing terminal 103, a function of receiving a document image data storage request from the information processing terminal 103, and a function of transmitting image data to the storage server 104.

The image processing unit 324 has an image binarization function, a processing (block selection (BS) processing) function of dividing the image data into areas corresponding to attributes such as a character, a table, and a graphic, and an optical character recognition processing (OCR processing) function, as functions of processing the image data received from the image forming apparatus 101. The image processing unit 324 also has a form matching function of comparing the positions or sizes of the areas obtained by the BS processing between forms to determine whether the forms have the same format, a function of learning a form, and a function of extracting an entity from a result of the BS/OCR processing.

The image binarization is processing for converting a color document image into a binary image such as a black-and-white image.

The conversion method is not particularly limited.

The BS/OCR processing to be executed by the image processing unit 324 will now be described. The BS processing is processing for analyzing a scan image and identifying an area indicating a position of a character string, a graphic, or the like. The OCR processing is processing for recognizing a character string (a character code) in a character image. In the present exemplary embodiment, the image processing unit 324 performs the BS/OCR processing to generate a BS/OCR result table as illustrated in FIG. 11.

The BS/OCR result table illustrated in FIG. 11 includes three columns, i.e., the "number" column, the "BS area" column, and the "character string" column, and one row of data is generated for each character string. The "number" column indicates a unique number for identifying each character string area. In the present exemplary embodiment, the numbers BS1 to BS9 are used. The "BS area" (which is information about an area determined in the BS processing) column indicates coordinates of the position of each character string area. For example, each BS area indicates four numbers, i.e., an X-coordinate and a Y-coordinate of an upper left vertex of the area and a width and a height of the area. The BS area corresponding to the number BS1 indicates "874, 333, 511, 73", i.e., an X-coordinate of 874, a Y-coordinate of 333, a width of 511, and a height of 73. The character string included in the BS area corresponding to the number BS1 is "quotation".

Next, learning processing to be executed by the image processing unit 324 will be described.

The image processing unit 324 executes the BS/OCR processing on the document image (the scan image data) received from the image forming apparatus 101 to generate the BS/OCR result table, and generates a learned form based on the generated BS/OCR result table and an entity result table acquired from the information processing terminal 103. The generated learned form is added to a learned form table as illustrated in FIG. 12.

The learned form table is held in a state where information about the BS areas of the image and the entity extraction result are associated with each other. This makes it possible to search for the previous entity extraction results in a case where an image having the same BS area positions (i.e., an image having the same form format as that of a learned form) is processed. The learned form table illustrated in FIG. 12 includes five columns, i.e., the "button number" column, the "form number" column, the "number" column, the "BS area" column, and the "category" column.

The "button number" column indicates a unique number for identifying a learned form on a button-by-button basis. The "form number" column indicates a unique number for identifying a learned form. The "number" column indicates a unique identification number. More specifically, a number indicating a BS area is given the prefix "BS", and a number indicating an entity extraction result is given the prefix "ET".

For example, assume a case where the category "Title" corresponds to the BS area indicated by the number BS1, the category "Name of Organization Issuing Document" corresponds to the BS area indicated by the number BS7, and the category "Name of Person Issuing Document" corresponds to the BS area indicated by the number BS8, as results of the scan processing with the button having the button number BTN1 and the entity extraction processing on the BS/OCR result table. In this case, a learned form identified by the button number BTN1 and the form number 1 is added to the learned form table.

In this case, the same numbers and BS areas as those in the BS/OCR result table are added to the learned form table. The numbers, the BS areas, and the categories that are obtained as the result of the entity extraction processing are also added to the learned form table.

Next, form matching processing to be executed by the image processing unit 324 will be described.

The form matching processing is processing for comparing the coordinate positions of the BS areas of forms and determining whether the BS areas match. The BS areas are determined to match if the BS areas have substantially the same X-coordinates, Y-coordinates, widths, and heights. The image processing unit 324 acquires all BS areas from the learned form table and compares the acquired BS areas on a form number by form number basis. For example, if the BS areas included in the BS/OCR result table illustrated in FIG. 11 are obtained as the result of the BS processing on scan image data, the BS areas corresponding to the numbers BS1 to BS9 in the BS/OCR result table are compared with the BS areas corresponding to the numbers BS1 to BS9 in the learned form having the form number 1 in the learned form table, respectively. If the BS areas corresponding to the numbers BS1 to BS9 in the BS/OCR result table substantially match the BS areas corresponding to the numbers BS1 to BS9 in the learned form having the form number 1 in the learned form table, respectively, the BS areas are determined to match. If the BS areas in the BS/OCR result table are determined to be different from those in the learned form having the form number 1, the BS areas are further compared with those in the learned form having the form number 2. If the BS areas are compared with those in all learned forms and are determined to be different from any of those, it is determined that there is no matching form.

Next, the entity extraction processing to be executed by the image processing unit 324 will be described.

The term "entity" used in the present exemplary embodiment refers to a value (a character string) that is extracted by natural language processing and corresponds to a predetermined item. In the entity extraction processing according to the present exemplary embodiment, the values corresponding to the items (the categories), such as "Name of Organization Issuing Document", "Name of Organization to Receive Document", "Name of Person Issuing Document", "Name of Person to Receive Document", "Document Creation Date", "Document Number", and "Title", are assumed to be extracted. The above-described categories are merely examples, and character strings corresponding to categories other than the above-described categories may also be extracted as the entities. A method for extracting the entities is as follows. A character string is divided into words using morphological analysis and a transformer-based machine learning model is generated using the words. A character string is input to the generated model to perform inference, so that an entity corresponding to a desired item (category) is extracted from the character string and the entity result table is generated. To generate a typical model, a pre-learning model such as bidirectional encoder representations from transformers (BERT) or generative pre-learned transformers (GPT) is used. Fine-tuning is performed using a word group obtained by dividing each character string, which has a feature of a desired entity to be extracted, using morphological analysis to generate a model based on the pre-learning model.

The value (The character string) corresponding to each item (category) extracted by the entity extraction processing and coordinate information about the BS area including the character string are stored in the entity result table. For example, an entity result table illustrated in FIG. 13 includes five columns, i.e., the "number" column, the "category" column, the "BS area" column, the "character string" column, and the "check required" column, and one row of data is generated for each character string. The "number" column indicates a number for uniquely identifying a character string in the entity result table. In the present exemplary embodiment, the numbers ET1, ET2, and ET3 are used. The "category" column indicates an entity to be extracted. The "BS area" column indicates the coordinates of the area of a character string determined to be the entity to be extracted. Each BS area indicates four numbers of an X-coordinate, a Y-coordinate, a width, and a height. The BS area corresponding to the number ET1 indicates "874, 333, 511, 73", i.e., an X-coordinate of 874, a Y-coordinate of 333, a width of 511, and a height of 73. The "character string" column indicates the character string determined to be the entity to be extracted. The "check required" column indicates whether the extraction result is to be checked by the user. More specifically, "1" is entered if the extraction result is to be checked, and "0" is entered if the extraction result is not to be checked. For the category for which no character string is extracted as the entity, a row in which the "BS area" field and the "character string" field are blank is generated (refer to the number ET3 in FIG. 14).

The image data check application 330 in the information processing terminal 103 includes a control unit 331, a storage unit 332, a communication unit 333, and a display unit 334.

The control unit 331 has an overall processing function related to the functions of the image data check application 330. The storage unit 332 has a function of holding the image data and the entity result table that are received from the image processing server 102. The communication unit 333 has a function of receiving the image data and the entity result table from the image processing server 102, and a function of transmitting a scan image data storage request. The display unit 334 has a function of displaying the image data and the entity extraction result received from the image processing server 102 and prompting the user to check the image data and the entity extraction result.

A data storage service 340 of the storage server 104 includes a control unit 341, a storage unit 342, and a communication unit 343.

The control unit 341 has an overall processing function related to the functions of the data storage service 340.

The storage unit 342 has a function of storing the image data and the entity result table received from the image processing server 102 in association with each other. The communication unit 343 has a function of receiving the image data and the entity result table from the image processing server 102.

Figure 4:
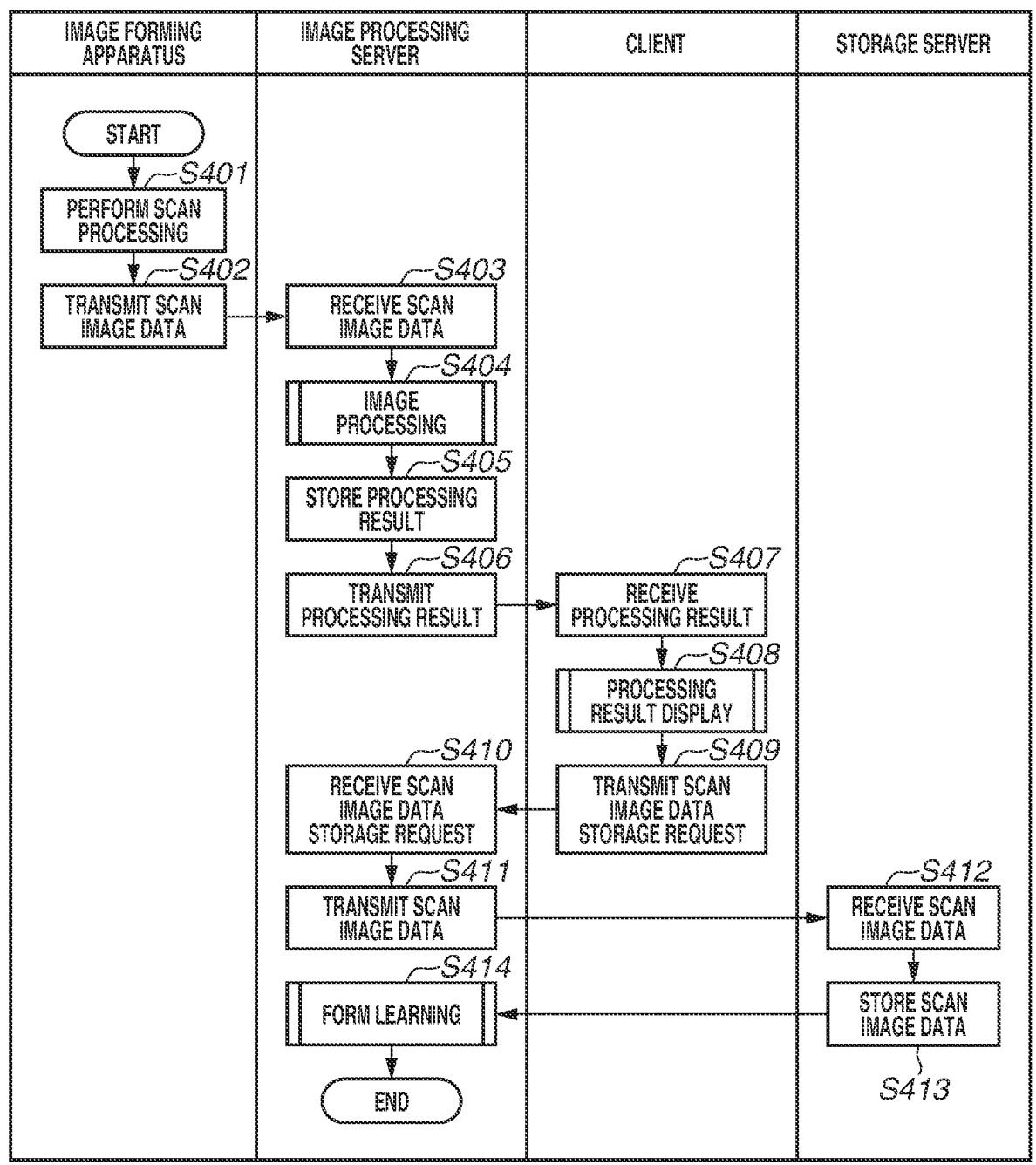
FIG. 4 is a sequence diagram illustrating overall processing executed in the image processing system according to the first exemplary embodiment.

FIG. 4 is a sequence diagram illustrating a procedure of processing in which the image processing server 102 extracts an entity from an image scanned by the image forming apparatus (the MFP) 101 and transmits the extracted entity to the storage server 104. Data exchange between the apparatuses in this processing will be mainly described.

First, a button for transmitting a scan image to a cloud storage is displayed on the touch panel of the MFP 101 based on information stored in the scan setting table. When the button is pressed by the user, the processing for transmitting the scan image to the cloud storage as illustrated in the sequence diagram of FIG. 4 is started. In the present exemplary embodiment, an example where the user executes the processing corresponding to the button number BTN1 in the scan setting table will be described.

In step S401, the control unit 311 of the image forming apparatus 101 executes the scan processing on a document via the scan unit 315 based on the scan setting corresponding to the button having the button number BTN1 pressed by the user on the display unit 314.

In step S402, the control unit 311 transmits scan image data generated in step S401 and the button number BTN1 based on which the scan processing is executed in step S401 to the image processing server 102 via the communication unit 313. While in the present exemplary embodiment, the example where the scan image data generated by scanning a document is transmitted as a processing target image to the image processing server 102, the present exemplary embodiment is not limited to this example. For example, a document image received via facsimile communication may be transmitted as a processing target image to the image processing server 102.

In step S403, the control unit 321 of the image processing server 102 receives the scan image data and the button number BTN1, which are transmitted in step S402, via the communication unit 323 and stores the scan image data and the button number BTN1 via the storage unit 322.

In step S404, the control unit 321 performs the image processing on the scan image data received in step S403, using the image processing unit 324. The image processing will be described in detail below.

In step S405, the control unit 321 stores the result of the processing in step S404 via the storage unit 322.

In step S406, the control unit 321 transmits the processing result (the BS/OCR result table, the entity result table, and the scan image data) obtained in step S404 to the information processing terminal (the client) 103 via the communication unit 323.

In step S407, the control unit 331 of the information processing terminal 103 receives the processing result transmitted in step S406, via the communication unit 333.

In step S408, the control unit 331 displays the processing result using the display unit 334 and prompts the user to check the processing result. The processing result display will be described in detail below.

In step S409, the control unit 331 reflects the entity extraction result checked and corrected by the user, in the entity result table and transmits a scan image data storage request including information about the corrected entity result table to the image processing server 102 via the communication unit 333.

In step S410, the control unit 321 of the image processing server 102 receives the scan image data storage request via the communication unit 323.

The control unit 321 acquires the entity result table included in the scan image data storage request received in step S410, acquires the scan image data via the storage unit 322, and transmits the acquired entity result table and the acquired scan image data to the storage server 104 via the communication unit 323.

In step S412, the control unit 341 of the storage server 104 receives the entity result table and the scan image data via the communication unit 343.

In step S413, the control unit 341 associates the entity result table received in step S412 with the scan image data received in step S412, as metadata of the received scan image data and stores the entity result table via the storage unit 342.

In step S414, the control unit 321 of the image processing server 102 acquires the entity result table included in the scan image data storage request received in step S410 and performs form learning via the image processing unit 324. The form learning will be described in detail below.

Figure 5:
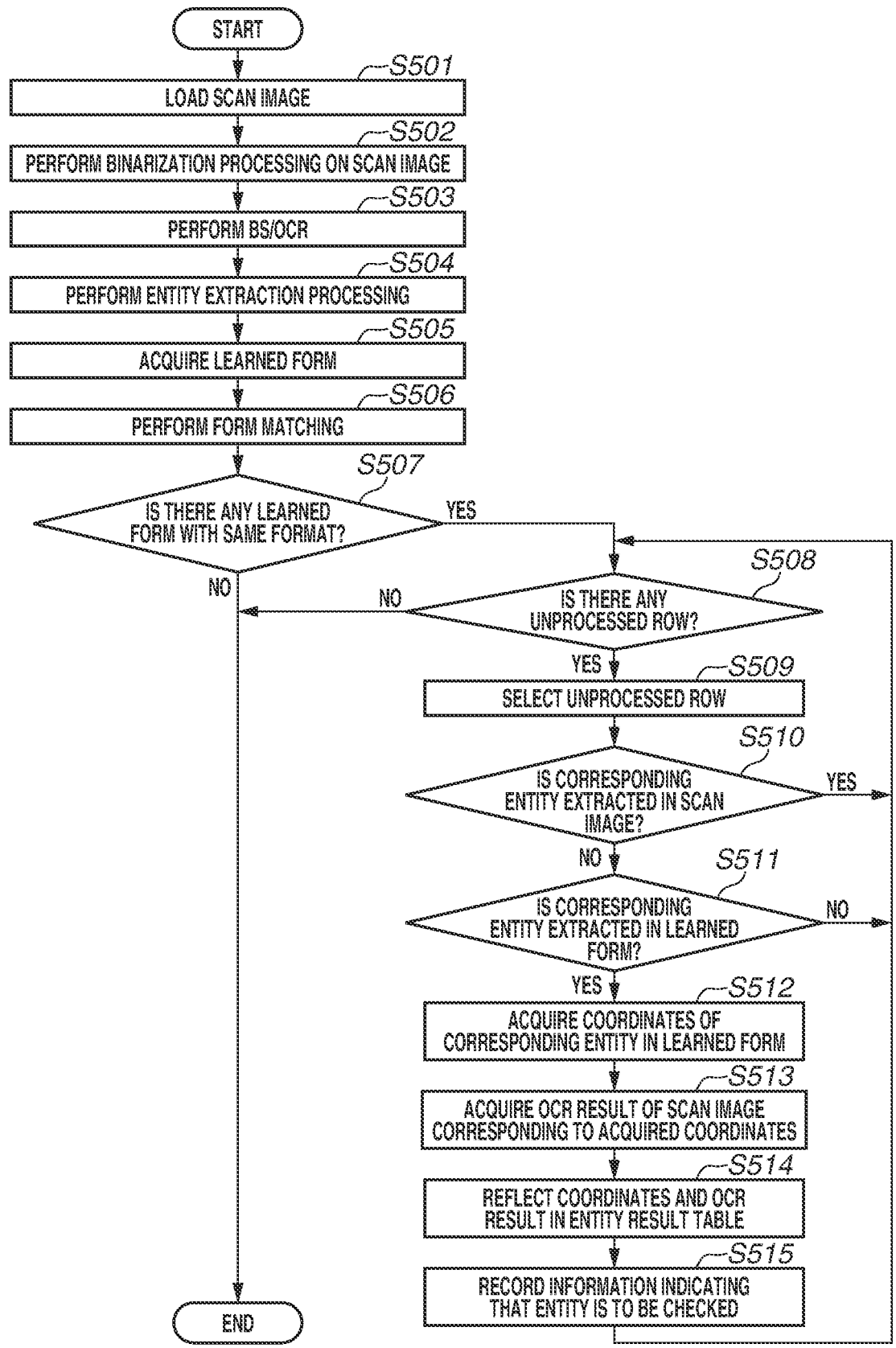
FIG. 5 is a flowchart illustrating image processing by an image processing server according to the first exemplary embodiment.

FIG. 5 is a flowchart illustrating details of the image processing in step S404.

In step S501, the control unit 321 of the image processing server 102 loads the scan image data received in step S403 into the image processing unit 324.

In step S502, the control unit 321 performs binarization processing on the scan image data loaded in step S501 to generate binarized image data via the image processing unit 324.

In step S503, the control unit 321 executes the BS/OCR processing on the generated binarized image data to acquire the BS/OCR result (the positional information about character string areas in the document image and the character recognition processing result indicating character strings) via the image processing unit 324. The acquired BS areas and OCR result indicating character strings are stored as the BS/OCR result table via the storage unit 322. In the present exemplary embodiment, the BS/OCR result table illustrated in FIG. 11 is assumed to be generated.

In step S504, the control unit 321 acquires the entity setting corresponding to the button number BTN1 stored in step S403 from the scan setting table, and performs the entity extraction processing on the character strings acquired in step S503, with the categories described in the acquired entity setting as extraction targets. The entity extraction result is stored as the entity result table via the storage unit 322. In the present exemplary embodiment, the entity result table as illustrated in FIG. 14 is assumed to be generated in step S504. In the example of FIG. 14, the entity corresponding to the category "Name of Person Issuing Document" in the row having the number ET3 is not extracted, and thus the "BS area" field and the "character string" field in the row are blank.

In step S505, the control unit 321 acquires, from the learned form table, information about the learned forms associated with the same button number as the button number BTN1 stored in step S403. In the present exemplary embodiment, information about the learned forms (the learned documents) associated with the same button number is acquired from the learned form table illustrated in FIG. 12 and is used as comparison targets in the form matching.

In step S506, the control unit 321 performs the form matching by comparing the BS areas of a learned form in the information acquired in step S505 with the BS areas of the scan image data acquired in step S503 to determine whether there is a learned form with the same layout (i.e., the same format) as that of the scan image data. In the present exemplary embodiment, assume that information about a learned form illustrated in FIG. 15 is determined to be a form with the same layout (the same format).

If the control unit 321 determines that there is a learned form (a learned document) with the same format, as a result of the form matching in step S506 (YES in step S507), the processing proceeds to step S508. If the control unit 321 determines that there is no learned form with the same format (NO in step S507), the processing is terminated.

In step S508, the control unit 321 determines whether the rows in the entity result table include a row on which processing in step S509 and subsequent steps is not performed. If the rows in the entity result table include a row on which the processing in step S509 and subsequent steps is not performed (YES in step S508), the processing proceeds to step S509. If the processing in step S509 and subsequent steps is performed on all the rows in the entity result table (NO in step S508), the processing is terminated.

In step S509, the control unit 321 selects a row on which the processing in step S510 and subsequent steps is not performed, from among the rows in the entity result table. For example, the row corresponding to the number ET3 illustrated in FIG. 14 is assumed to be selected.

In step S510, the control unit 321 determines whether the "BS area" field and the "character string" field in the row of the entity result table that is selected in step S509 are blank. If the "BS area" field and the "character string" field are not blank (If the entity corresponding to the category is extracted) (YES in step S510), the processing returns to step S508. If the "BS area" field and the "character string" field are blank (If the entity corresponding to the category is not extracted (NO in step S510), the processing proceeds to step S511. For example, the "BS area" field and the "character string" field in the row corresponding to the number ET3 illustrated in FIG. 14 are blank. In this case, the processing proceeds to step S511.

In step S511, the control unit 321 determines whether the "BS area" field in the row having the same category as that in the row selected in step S509 is blank in the learned form acquired in step S506. If the "BS area" field is not blank, i.e., the entity corresponding to the category is extracted in the learned form (YES in step S511), the processing proceeds to step S512. If the "BS area" field is blank (NO in step S511), the processing returns to step S508. For example, the row having the number ET3 illustrated in FIG. 15 indicates the same category as the category "Name of Person Issuing Document" indicated by the row having the number ET3 illustrated in FIG. 14, and the "BS area" field in this row is not blank. In this case, the processing proceeds to step S512.

In step S512, the control unit 321 acquires positional information about the BS area in the row having the same category as that in the row selected in step S509, from the learned form acquired in step S506. For example, the positional information "197, 833, 309, 35" about the BS area corresponding to the number ET3 illustrated in FIG. 15 is acquired.

In step S513, the control unit 321 acquires a character string in the row corresponding to the positional information about the BS area acquired in step S512, from the BS/OCR result table stored in step S503. For example, "Toshiro Miki" is acquired as the character string included in the BS area at the position corresponding to the positional information "197, 833, 309, 35" acquired in step S512.

In step S514, the control unit 321 reflects the positional information about the BS area acquired in step S512 and the character string acquired in step S513, in the row of the entity result table selected in step S509.

In step S515, the control unit 321 enters "1" in the "check required" field in the row of the entity result table selected in step S509 to record information indicating that the entity is to be checked. This is because, considering that a learned form in a format different from that of the scan image may be erroneously determined to be matched in step S506, the user is prompted to check that the entity result is not corrected in a BS area different from a desired BS area in the processing of step S514.

As a result of the processing in steps S514 and S515, the entity result table illustrated in FIG. 14 is updated as illustrated in FIG. 13.

FIG. 6 is a flowchart illustrating details of the processing in step S408.

In step S601, the control unit 331 of the information processing terminal 103 causes the display unit 334 to display a screen based on the scan image data and the contents of the entity result table based on the processing result received in step S407. FIG. 7 illustrates an example of the displayed screen. As illustrated in FIG. 7, an area 701 displays a preview of the scan image data, and an area 702 displays the entity extraction result. The area 702 displays the BS area and the character string corresponding to each category in the entity result table. The user performs an operation to select text boxes corresponding to the displayed BS area and character string and correct the BS area and character string, thereby making it possible to correct the contents of the entity result table via the operation unit 236. A save button 703 is used to terminate the check and correction by the user and issue an image storage instruction. A warning display 704 indicates an entity to be checked by the user and is displayed beside the corresponding category. The warning display 704 is displayed by processing in step S603 to be described below.

In step S602, the control unit 331 determines whether the entity result table received in step S407 includes a row in which the "check required" field indicates "1". If there is a row in which the "check required" field indicates "1" (YES in step S602), the processing proceeds to step S603. If there is no row in which the "check required" field indicates "1" (NO in step S602), the processing is terminated.

In step S603, the control unit 331 displays the warning display 704 beside the category corresponding to the row in which the "check required" field indicates "1", and then the processing is terminated.

Figure 8:
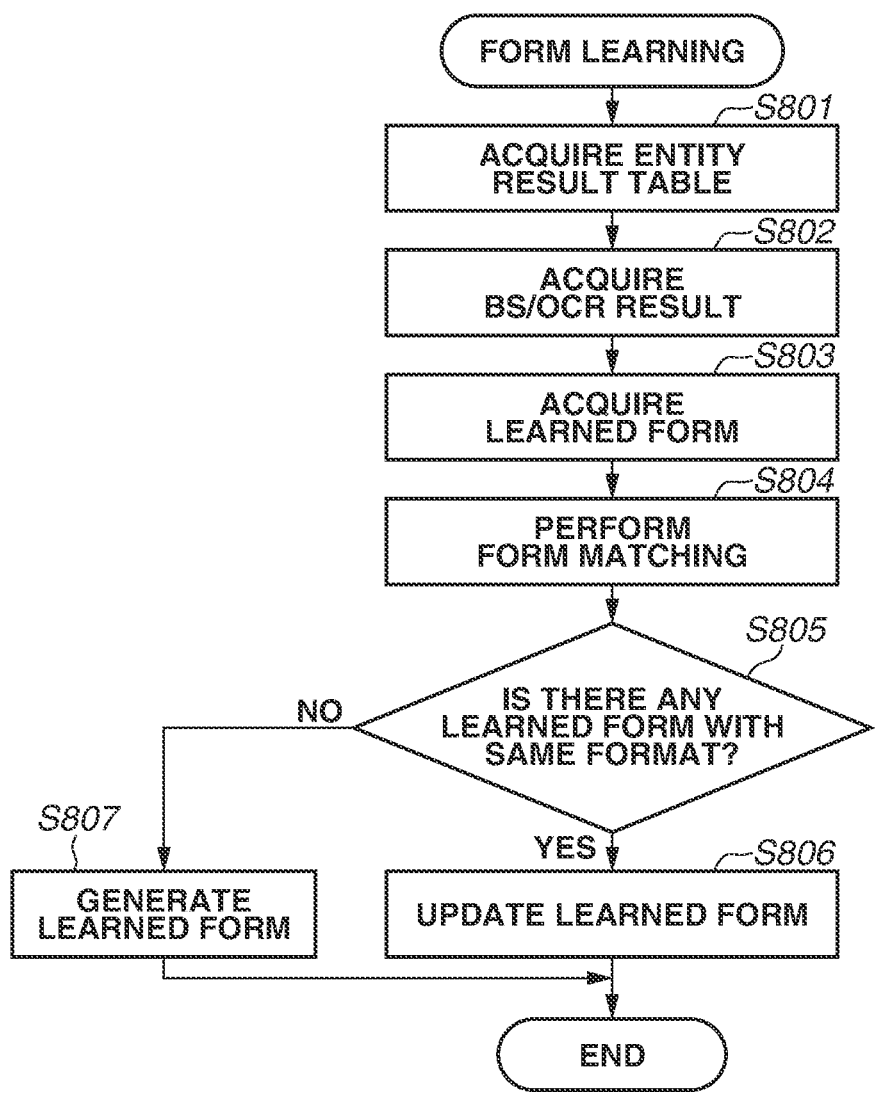
FIG. 8 is a flowchart illustrating form learning by the image processing server according to the first exemplary embodiment.

FIG. 8 is a flowchart illustrating details of the processing in step S414.

In step S801, the control unit 321 of the image processing server 102 acquires the entity result table checked and corrected by the user that is included in the scan image data storage request received in step S410.

In step S802, the control unit 321 acquires the BS areas and the OCR result indicating character strings that are stored in step S503.

In step S803, the control unit 321 acquires learned forms via the storage unit 322 in the same manner as in step S505.

In step S804, the control unit 321 performs the form matching by comparing the BS areas of a learned form acquired in step S803 with the BS areas indicated by the processing result acquired in step S802 to acquire the learned form determined to have the same layout via the image processing unit 324.

In step S805, the control unit 321 determines whether the learned form is acquired in step S804 (whether the learned form is determined to have the same layout in step S804).

As a result of the form matching, if the control unit 321 determines that there is a learned form with the same layout (YES in step S805), the processing proceeds to step S806. In step S806, the BS areas of the learned form acquired in step S804 are updated with the BS areas acquired in step S802 and the BS areas in the entity result table acquired in step S801, and then the processing is terminated.

As a result of the form matching, if the control unit 321 determines that there is no learned form with the same layout (a form with the same layout is not learned) (NO in step S805), the processing proceeds to step S807. In step S807, a learned form is generated based on the BS areas acquired in step S802 and the entity result table acquired in step S801, and the generated learned form is added to the learned form table. Then, the processing is terminated.

In the present exemplary embodiment, any network, such as a wired local area network (LAN), a wireless LAN, or the Internet, can be used as the network 105 as long as the network enables the apparatuses in the image processing system to communicate with each other.

The image processing server 102 and the storage server 104 may operate on a server personal computer (PC) on a local network, or may be virtual servers or services to be implemented on a cloud service.

While the scan settings are held in the scan setting table in the present exemplary embodiment, the scan settings may optionally be made from an external apparatus.

According to the present exemplary embodiment, in the BS area comparison in the form matching, if the BS areas of forms have the same coordinate positions, the same widths, and the same heights, the forms are determined to match. Alternatively, a coordinate value range may be set as a determination criterion, and the forms may be determined to match if the coordinate values of the BS areas fall within the range. Instead of determining that the forms match if all the BS areas of the forms match in the form matching, the forms may be determined to match, for example, if the BS areas in the upper portions (e.g., the upper half portions) of the forms match, or if a predetermined number or more of BS areas match between the forms.

According to the present exemplary embodiment described above, if a character string is not extracted from a document, as an entity corresponding to a desired item (refer to the number ET3 in FIG. 14), the entity extraction result can be corrected (refer to FIG. 13) using the positional information (refer to FIG. 15) obtained when a character string is previously extracted as the entity from a learned form with the same format.

In a second exemplary embodiment, a method for prompting the user to check an entity extraction result of a processing target image if the entity extraction result is determined to be less valid as a result of comparing the entity extraction result with an entity extraction result of a learned form even in a case where the entity extraction result is not blank, in addition to the first exemplary embodiment will be described. In the present exemplary embodiment, descriptions of the system configuration, the software configuration, and the like that are similar to those in the first exemplary embodiment will be omitted.

Figure 9:
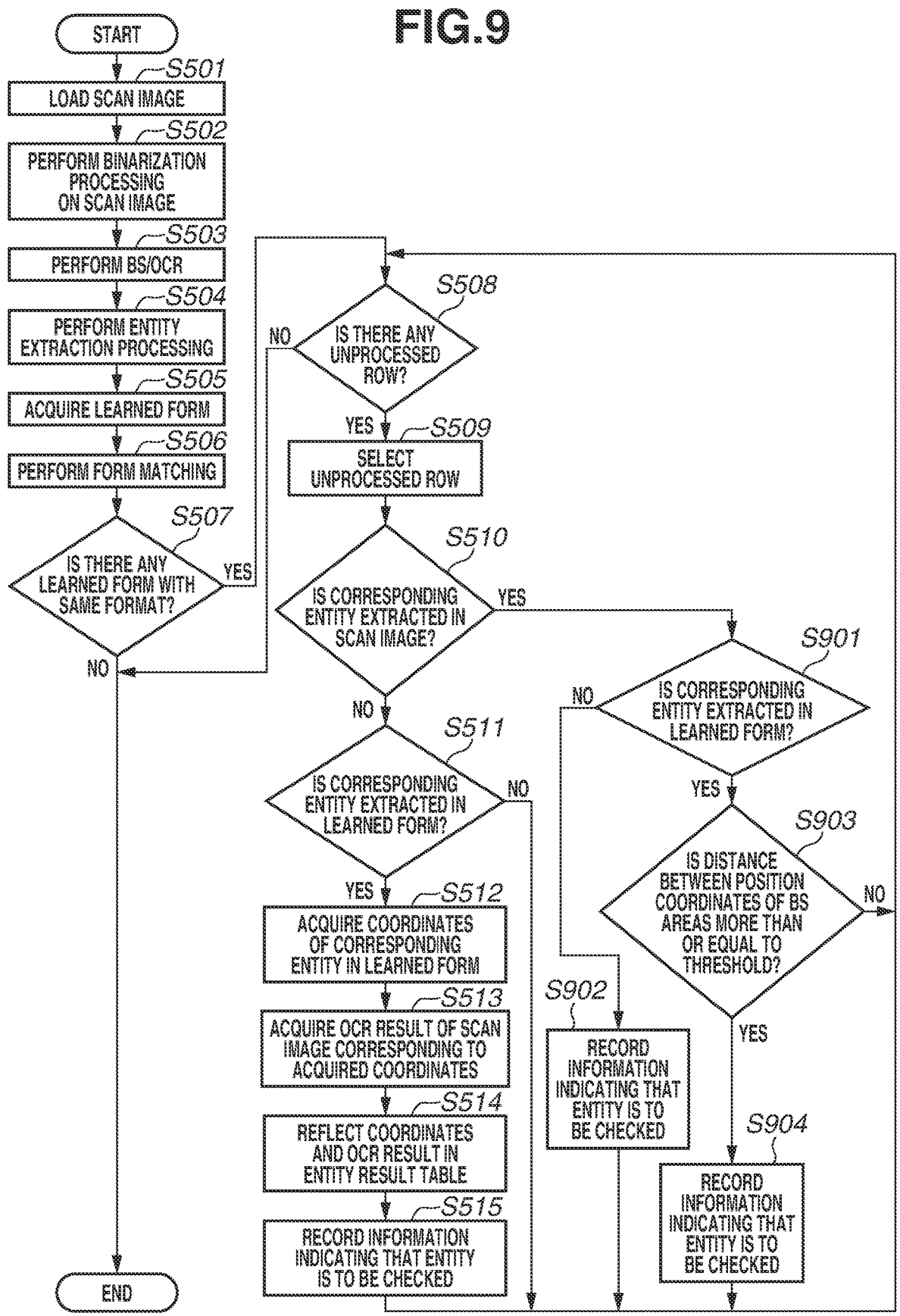
FIG. 9 is a flowchart illustrating image processing by an image processing server according to a second exemplary embodiment.

FIG. 9 is a flowchart illustrating details of the processing in step S404.

If the control unit 321 determines that the "BS area" field and the "character string" field in the row of the entity result table selected in step S509 are not blank (YES in step S510), the processing proceeds to step S901. In step S901, the control unit 321 determines whether the "BS area" field in the row having the same category as that in the row selected in step S509 is blank in the learned form acquired in step S506.

If the control unit 321 determines that the "BS area" field in the corresponding row in the learned form is blank (NO in step S901), the processing proceeds to step S902. In step S902, "1" is entered in the "check required" field in the row of the entity result table selected in step S509 to record information indicating that the entity is to be checked. It is natural that the same entity can be extracted at the same coordinates in the forms with the same format. If the previous extraction result indicating whether the extraction is successful or unsuccessful is different from the extraction result of the scan image received this time, it is considered that the extraction result is less valid. For this reason, the user is prompted to check the processing result.

In step S903, the control unit 321 compares the position coordinates of the BS area in the row of the entity result table selected in step S509 with the position coordinates of the BS area in the row having the same category as that in the row selected in step S509 in the learned form acquired in step S506, and determines whether a distance between the BS areas is more than or equal to a predetermined threshold. As the distance between the BS areas, a distance between the coordinates of upper left vertices of the BS areas is measured. If the distance between the BS areas is smaller than the threshold (NO in step S903), the processing returns to step S508.

If the control unit 321 determines that the distance between the BS areas is more than or equal to the threshold (YES in step S903), the processing proceeds to step S904. In step S904, "1" is entered in the "check required" field in the row of the entity result table selected in step S509 to record information indicating that the entity is to be checked. It is natural that the same entity can be extracted at the same coordinates in the forms with the same format. If the coordinates indicated by the previous extraction result are away from the coordinates indicated by the extraction result of the scan image received this time, it is considered that the extraction result is less valid. For this reason, the user is prompted to check the processing result.

In the present exemplary embodiment, the distance between the coordinates of the upper left vertices is used as the distance between the BS areas. Alternatively, any other method, such as a method using the barycenter-to-barycenter distance between the BS areas, may be used.

According to the present exemplary embodiment described above, even in a case where an entity extraction result is not blank, it is possible to prompt the user to check the entity extraction result if the entity extraction result is determined to be less valid as a result of comparing the entity extraction result with an entity extraction result of a learned form.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-137679, filed Aug. 26, 2021, which is hereby incorporated by reference herein in its entirety.

What is claimed is:

1. An image processing apparatus comprising:
   at least one memory that stores a program; and
   at least one processor that executes the program to:
   obtain a character recognition result by performing character recognition processing on a first document image as a processing target;
   extract a character string corresponding to a predetermined item by performing entity extraction based on the character recognition result; and
   acquire, in a case where the character string corresponding to the predetermined item is not extracted in the first document image by the entity extraction, the character string corresponding to the predetermined item in the first document image, based on positional information about an area where the character string corresponding to the predetermined item is previously extracted in a second document image having a same format as a format of the first document image,
   wherein the second document image is determined to have the same format as the format of the first document image by comparing coordinates of each character string in the second document image with each character string from the first document image.

2. The image processing apparatus according to claim 1, wherein the character recognition result is obtained by performing the character recognition processing on a character string area in the first document image.

3. The image processing apparatus according to claim 1, wherein the entity extraction includes natural language processing.

4. The image processing apparatus according to claim 1, wherein the first document image is at least one of a document image generated by scanning or a document image received by facsimile.

5. The image processing apparatus according to claim 1, wherein the second document image having the same format as the format of the first document image is determined based on a position of a character string area in the first document image.

6. The image processing apparatus according to claim 1, wherein, in a case where the character string corresponding to the predetermined item in the first document image is acquired based on the positional information about the area where the character string corresponding to the predetermined item is previously extracted in the second document image, a user is prompted to check the acquired character string.

7. The image processing apparatus according to claim 1, wherein, in a case where the character string corresponding to the predetermined item is extracted in the first document image by the entity extraction and the character string corresponding to the predetermined item is not previously extracted in the second document image having the same format as the format of the first document image, a user is promoted to check the character string corresponding to the predetermined item extracted by the entity extraction.

8. The image processing apparatus according to claim 1, wherein, in a case where the character string corresponding to the predetermined item is extracted in the first document image by the entity extraction, the character string corresponding to the predetermined item is previously extracted in the second document image having the same format as the format of the first document image, and a distance between an area where the character string corresponding to the predetermined item is extracted in the first document image by the entity extraction and the area where the character string corresponding to the predetermined item is previously extracted in the second document image is more than or equal to a predetermined threshold, a user is prompted to check the character string corresponding to the predetermined item extracted by the entity extraction.

9. A non-transitory computer-readable storage medium storing an instruction that causes a computer to:
   obtain a character recognition result by performing character recognition processing on a first document image as a processing target;
   extract a character string corresponding to a predetermined item by performing entity extraction based on the character recognition result; and
   acquire, in a case where the character string corresponding to the predetermined item is not extracted in the first document image by the entity extraction, the character string corresponding to the predetermined item in the first document image, based on positional information about an area where the character string corresponding to the predetermined item is previously extracted in a second document image having a same format as a format of the first document image,
   wherein the second document image is determined to have the same format as the format of the first document image by comparing coordinates of each character string in the second document image with each character string from the first document image.

10. An image processing method comprising:
   obtaining a character recognition result by performing character recognition processing on a first document image as a processing target;
   extracting a character string corresponding to a predetermined item by performing entity extraction based on the character recognition result; and
   acquiring, in a case where the character string corresponding to the predetermined item is not extracted in the first document image by the entity extraction, the character string corresponding to the predetermined item in the first document image, based on positional information about an area where the character string corresponding to the predetermined item is previously extracted in a second document image having a same format as a format of the first document image, wherein the second document image is determined to have the same format as the format of the first document image by comparing coordinates of each character string in the second document image with each character string from the first document image.

* * * * *